(12) United States Patent
Ui et al.

(10) Patent No.: US 8,539,549 B2
(45) Date of Patent: Sep. 17, 2013

(54) IDENTIFIER AUTHENTICATION SYSTEM

(75) Inventors: Takaharu Ui, Tokyo (JP); Toshihide Uotani, Tokyo (JP); Shin Yoshimura, Tokyo (JP); Hiroshi Takada, Tokyo (JP)

(73) Assignees: Japan Registry Services, Co., Ltd., Tokyo (JP); Shin Yoshimura, Tokyo (JP)

( * ) Notice: Subject to any disclaimer, the term of this patent is extended or adjusted under 35 U.S.C. 154(b) by 1425 days.

(21) Appl. No.: 12/084,126

(22) PCT Filed: Oct. 24, 2006

(86) PCT No.: PCT/JP2006/321134
§ 371 (c)(1),
(2), (4) Date: Apr. 25, 2008

(87) PCT Pub. No.: WO2007/049600
PCT Pub. Date: May 3, 2007

(65) Prior Publication Data
US 2009/0106354 A1    Apr. 23, 2009

(30) Foreign Application Priority Data
Oct. 26, 2005    (JP) ................. 2005-311079

(51) Int. Cl.
*H04L 29/06*    (2006.01)

(52) U.S. Cl.
USPC ................................. 726/2; 726/6

(58) Field of Classification Search
None
See application file for complete search history.

(56) References Cited

U.S. PATENT DOCUMENTS

| | | | |
|---|---|---|---|
| 7,024,697 B2 * | 4/2006 | Nitaki | 726/26 |
| 7,516,240 B2 * | 4/2009 | Liskov et al. | 709/239 |
| 2002/0064271 A1 * | 5/2002 | Stumer | 379/211.02 |
| 2006/0089152 A1 * | 4/2006 | Mahonen | 455/456.1 |
| 2006/0265392 A1 * | 11/2006 | Sunada et al. | 707/10 |

FOREIGN PATENT DOCUMENTS

| | | |
|---|---|---|
| JP | 5-347673 | 12/1993 |
| JP | 11-345285 | 12/1999 |
| JP | 2004-134954 | 4/2004 |
| JP | 2005-182652 | 7/2005 |
| JP | 2005-234889 | 9/2005 |

OTHER PUBLICATIONS

K. Taketani et al., "DNS no Kaiso Cashing ni yoru Kokateki na Namae Kaiketsuho", Information Processing Society of Japan Dai 67 Kai Zenkoku Taikai Koen Ronbunshu (3), Mar. 2, 2005, p. 3-705, p. 3-706.

Norizo, "Imasugu Hajimeru Internet Server Linux start Dai 2 Kai DNS Server", *Linux magazine*, Ascii Corp., Jan. 1, 2005, vol. 7, No. 1, pp. 58-71.

* cited by examiner

*Primary Examiner* — Michael S McNally
*Assistant Examiner* — Carlton Johnson
(74) *Attorney, Agent, or Firm* — Clark & Brody

(57) ABSTRACT

There is provided an identifier authentication system in which information requesting users can share all predetermined information held in a plurality of information providing servers.

In the identifier authentication system, when an identifier holding user 19 presents an identifier to an information requesting server 15, the information requesting server 15 asks a location management server 13 about a location of an information providing server 14 corresponding to the presented identifier, the location management server 13 returns the confirmed IP address of the information providing server 15 corresponding to the presented identifier to the information requesting server 15 based on the location information, the information requesting server 15 accesses the information providing server 14 corresponding to the confirmed IP address by using the confirmed IP address, and receives predetermined information corresponding to the presented identifier from the accessed information providing server 14.

17 Claims, 3 Drawing Sheets

# IDENTIFIER AUTHENTICATION SYSTEM

TECHNICAL FIELD

The present invention relates to an identifier authentication system in which predetermined information held in a plurality of information providing serves can be shared.

BACKGROUND ART

There is an information network system in which an information providing server installed in an information providing company is connected with an information terminal installed for an information requesting user who receives information through a network (see Patent Document 1). The information providing server has information storing means for storing information from an information providing user who provides the information to the information providing server or information from the information requesting user and information transmitting means for transmitting information. The information terminal has a display section that displays information provided from the information providing server and information receiving means for receiving information from the information providing server. In the system, when contents of information held in the information providing server are updated or new information is transmitted to the information providing server from the information providing user, contents of such information is displayed at a predetermined position in the display section of the information terminal. According to this system, updated information or new information can be confirmed by just seeing the display section of the terminal without operating the information terminal by the information requesting user.

Patent Document 1: Japanese Patent Application Laid-open No. 2004-134954

DISCLOSURE OF INVENTION

Problem to be Solved by the Invention

The information network system disclosed in the patent publication is a proprietary private network and also a closed network set in one region or at one point, and hence any user other than the information requesting users in this network cannot access this network. In this information network system, only the information requesting users in the private network can share information, and any user other than the information requesting users in the private network cannot utilize information held in the information providing server of this network. When a user other than the information requesting users who are currently using this information network system utilizes this system, a network must be newly configured in the private network.

It is an object of the present invention to provide an identifier authentication system in which information requesting users can share all predetermined information held in a plurality of information providing server.

Means for Solving Problem

A premise of the present invention for solving the problem is an identifier authentication system in which an information providing server holding predetermined information and an information requesting server that requests the information providing server to provide the predetermined information form each of a plurality of independent private networks and presenting a predetermined identifier to the information requesting server by an identifier holding user having the identifier given from the information providing server enables providing the predetermined information corresponding to the presented identifier to the information requesting server from the information providing server.

The present invention in the premise is characterized in that the identifier authentication system comprises a location management server that unifies management of the information providing servers and location information of the information providing serves is registered in the location management server and, in the system, when the identifier holding user presents the identifier to the information requesting server, the information requesting server asks the location management server about a location of the information providing server corresponding to the presented identifier, the location management server returns confirmed location information of the information providing server corresponding to the presented identifier to the information requesting server based on the location information, and the information requesting server uses the confirmed location information to access the information providing server corresponding to the confirmed location information and receives the predetermined information corresponding to the presented identifier from the accessed information providing server.

As an example of an embodiment according to the present invention, the location management server is divided into the highest-order first location management server to the lowest-order nth location management server, the first to nth location management servers and the information providing server form a tree structure that branches from the first to nth location management servers toward the information providing server, and confirmed location information of the information providing server is registered in any one of the plurality of nth location management servers, the first location management server returns confirmed location information of the second location management server corresponding to the presented identifier to the information requesting server based on the location information when the information requesting server asks the first location management server about a location of the information providing server corresponding to the presented identifier, the second location management server returns confirmed location information of the third location management server corresponding to the presented identifier to the information requesting server based on the location information when the information requesting server accesses the second location management server corresponding to the returned confirmed location information and asks the second location management server about a location of the information providing server corresponding to the identifier, the information providing server corresponding to the presented identifier is retrieved by repeating an inquiry and a response between the location management servers and the information requesting server starting from the first location management server to the nth location management server in this manner, and the retrieved information providing server provides predetermined information corresponding to the presented identifier to the information requesting server.

As another example of the embodiment according to the present invention, the information requesting server stores confirmed location information of the location management server and the information providing server returned based on retrieval of locations in the past, and the identifier authentication system omits retrieval of a location management server whose level is higher than that of the location management server storing the confirmed location information saved in the information requesting server when an identifier corresponding to the confirmed location information returned based on retrieval of locations in the past is again presented to the information requesting server, and retrieves the information providing server corresponding to the presented identifier by repeating an inquiry and a response between the location management server and the information requesting server starting from the low-order location management server close to the location management server storing the confirmed location information toward the lower-order location management servers when the low-order location management server that is lower in order than that of the low-order location management server close to the location management server storing the confirmed location information and the information providing server must be retrieved, and the retrieved information providing server provides predetermined information corresponding to the presented identifier to the information requesting server.

As still another example of the embodiment according to the present invention, storage times of confirmed location information of the location management server and the information providing server returned based on retrieval of locations in the past are set in the information requesting server, and the information requesting server erases the confirmed location information of the location management server and the information providing server stored therein when the storage times pass.

As yet another example of the embodiment according to the present invention, the information requesting server is able to arbitrarily erase the confirmed location information of the location management server and the information providing server stored in the information requesting server and returned based on retrieval of locations in the past.

As a further example of the embodiment according to the present invention, in the identifier authentication system, when a presentation time that the identifier is presented to the information requesting time is transmitted to the information providing server from the information requesting server and the information providing server determines that the presentation time exceeds a set time, provision of the predetermined information to the information requesting server is stopped.

As a still further example of the embodiment according to the present invention, the information providing servers, the information requesting servers, and the location management server are connected with each other through the Internet, and a series of processes including an inquiry of a location of the information providing server with respect to the location management server, return of the confirmed location information from the location management server to the information requesting server, and reception of the predetermined information by the information requesting server are executed in the identifier authentication system through the Internet.

Effect of the Invention

According to the identifier authentication system of the present invention, the predetermined information held in the respective information providing servers can be shared, and the predetermined information stored in the information providing servers can be readily obtained. According to the system, since the location management server unifies management of all the information providing servers and the location management server responds to an inquiry about confirmed location information of the information providing server, the information requesting server can access all the information providing servers holding the predetermined information, and all the information requesting servers can receive each predetermined information from these information providing servers. Using this system enables sharing all the predetermined information held in the plurality of information providing servers, and hence various kinds of identifier authentication services can be received without being restricted to a specific identifier authentication service.

According to the identifier authentication system that retrieves the information providing server corresponding to an identifier by repeating an inquiry and a response between the location management server and the information requesting server, the location management server is divided into the highest-order first location management server to the lowest-order nth location management server, and the plurality of location management servers hierarchically decentralize and manage the location information of the information providing servers, thereby reducing a burden on the location management servers as compared with an example where the single location management server manages the location information of these information providing servers. Even if the location information of many information providing servers is registered in the location management server, this system can avoid an excessive load on the location management server.

When retrieval of the location management servers whose levels are higher than that of the location management server storing the confirmed location information saved in the information requesting server is omitted and retrieval of the location management servers whose levels are lower than that of the low-order location management server close to the location management server storing the confirmed location information and the information providing server is required, the identifier authentication system that retrieves the information providing server corresponding to an identifier by repeating an inquiry and a response between the location management server and the information requesting server starting from the low-order location management server close to the location management server storing the confirmed location information toward the lower-order location management server can rapidly retrieve the information providing server without a need of repeating retrieval of the information providing server from the first location management server. Further, this system can eliminate a load on the location management servers whose levels are higher than that of the location management server storing the confirmed location information.

Even if the information requesting server stores the confirmed location information and then the location information of the location management server or the information providing server associated with this confirmed location information is changed, the identifier authentication system that erases the confirmed location information stored in the information requesting server when a storage time for the confirmed location information passes can cope with this change and accurately retrieve a location of the information providing server. It is to be noted that, when the stored confirmed location information is erased after a predetermined time period passes, repeating an inquiry and a response between the location management server and the information requesting server starting from the first location management server toward the nth location management server enables retrieving the information providing server corresponding to the identifier.

Even if the information requesting server stores the confirmed location information and then the location information of the location management server or the information providing server associated with this confirmed location information is changed, the identifier authentication system that can arbitrarily erase the confirmed location information of the location management server and the information providing server stored in the information requesting server can cope with this change and can accurately retrieve a location of the information providing server. It is to be noted that, when the stored confirmed location information is arbitrarily erased, repeating an inquiry and a response between the location management server and the information requesting server starting from the first location management server toward the nth location management server enables retrieving the information providing server corresponding to the identifier.

The identifier authentication system that stops provision of predetermined information to the information requesting server when a presentation time of an identifier for the information requesting server exceeds a set time can avoid unauthorized use of the identifier by a person other than identifier holding users, thereby preventing information of the identifier holding users from fraudulently flowing out.

The identifier authentication system in which the information providing servers, the information requesting servers, and the location management server are connected with each other through the Internet and a series of processes, i.e., an inquiry, a response, and reception of predetermined information are executed through the Internet can utilize the Internet to enable sharing the predetermined information held in these information providing servers and can enable any person to easily obtain the predetermined information stored in these information providing servers anywhere as long as an Internet connected environment is present. This system enables sharing all the predetermined information held in the plurality of information providing servers by utilizing the Internet as an existing public communication network so that information requesting users can receive various kinds of identifier authentication services without being restricted to a specific identifier authentication service.

Figure 1:
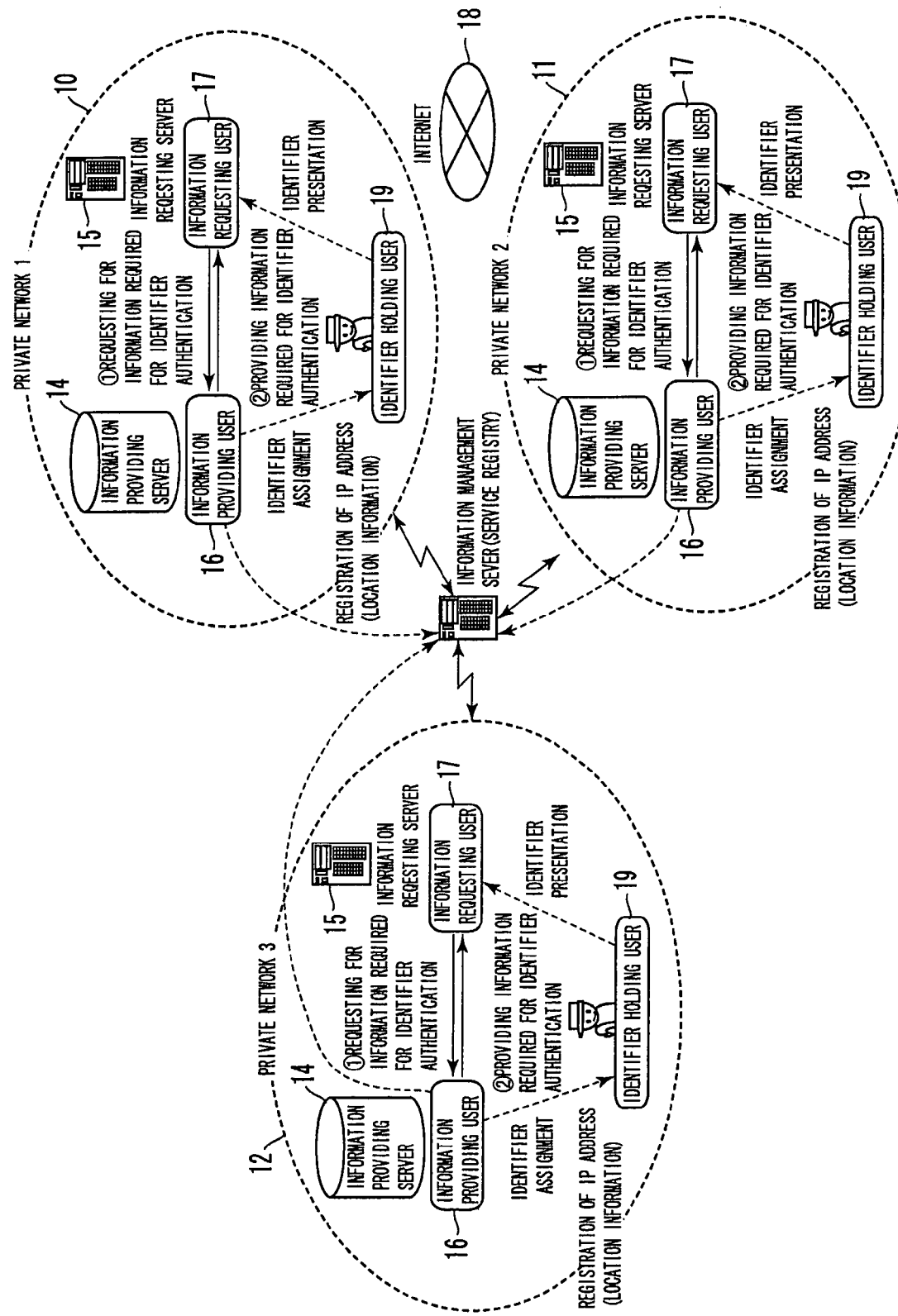
FIG. 1 is a conceptual view of an identifier authentication system.

EXPLANATIONS OF LETTERS OR NUMERALS 10 private network
11 private network
12 private network
13 location management server
13a first location management server
13b second location management server
13c third location management server
14 information providing server
15 information requesting server
16 information providing user
17 information requesting user
18 Internet
19 identifier holding user
20 service registry

BEST MODE(S) FOR CARRYING OUT THE INVENTION

Figure 2:
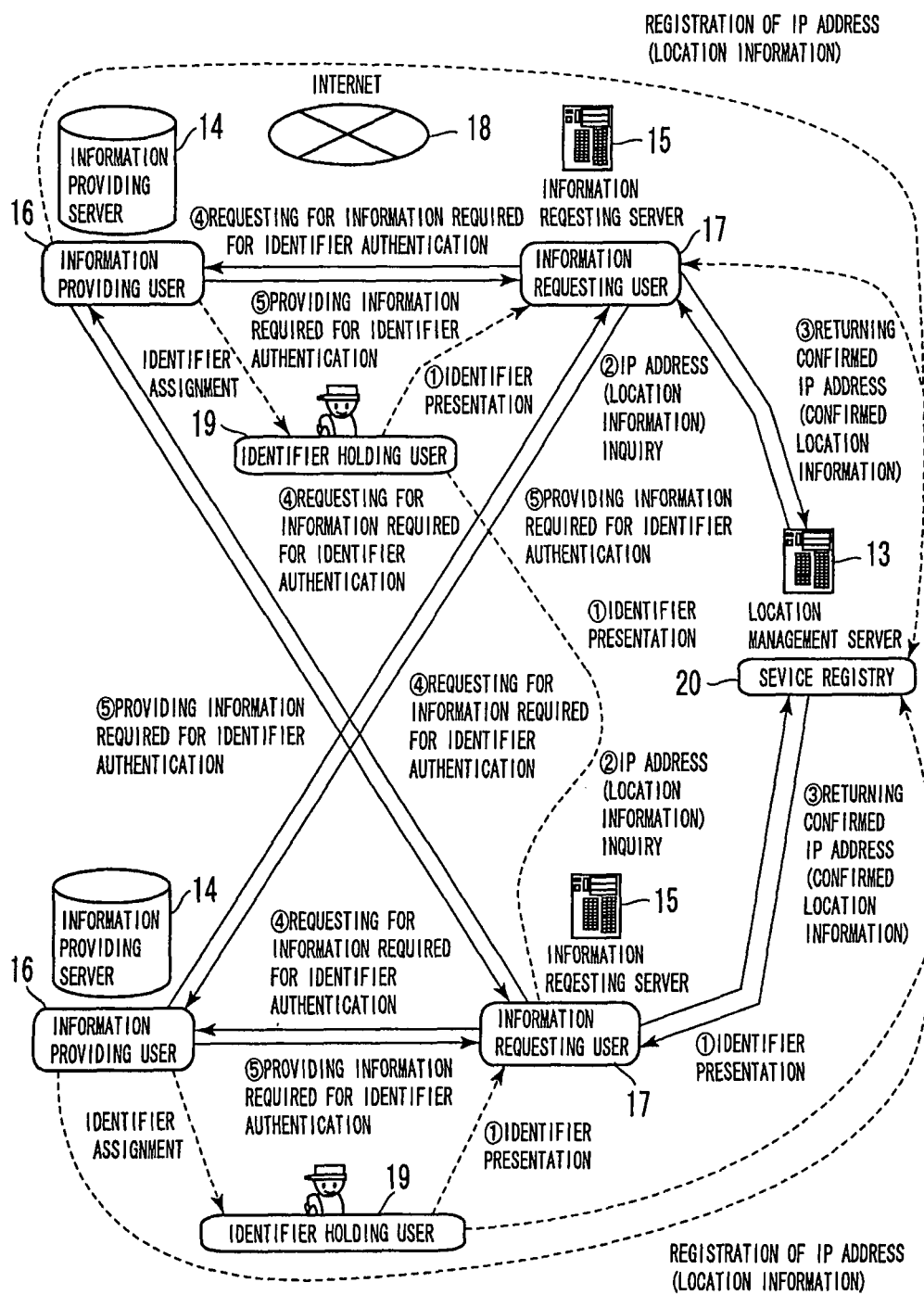
FIG. 2 is a block diagram showing the system as an example.
Figure 3:
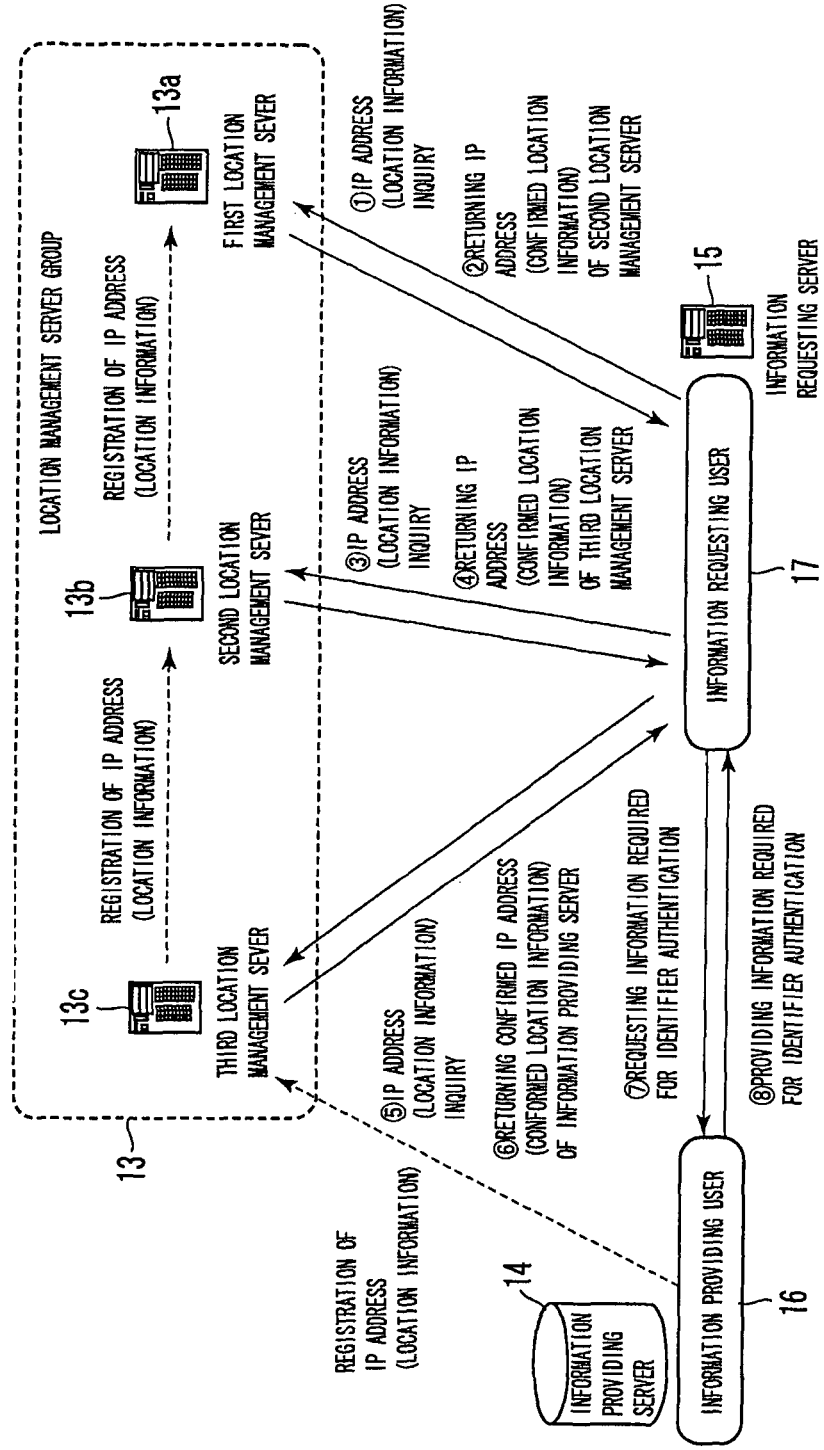
FIG. 3 is a view showing an example of a procedure of retrieving a confirmed IP address of an information providing server 14.

Details of an identifier authentication system according to the present invention will now be explained as follows with reference to the accompanying drawings. FIG. 1 is a conceptual view of an identifier authentication system, and FIG. 2 is a block diagram showing the system as an example. FIG. 3 is a view showing an example of a procedure for retrieving a confirmed IP address of an information providing server 14 executed between a location management server 13 and an information requesting server 15. The identifier authentication system is formed of a plurality of private networks 10, 11, and 12 and the location management server 13 that unifies management of the later-explained information providing servers 14.

Each of the private networks 10, 11, and 12 is formed of the information providing server 14 that holds predetermined information and the information requesting server 15 that requests the information providing server 14 to provide the predetermined information. The information providing server 14 is managed by an information providing user 16 who provides the predetermined information. The information requesting server 15 is managed by an information requesting user 17 who requests the information providing user 16 to provide the predetermined information. The information providing server 14 or the information requesting server 15 is a computer having a high-capacity hard disk mounted thereon, and can be connected with the Internet 18. Although not shown, a keyboard, a printer, or a display is connected with each of the servers 14 and 15 through an interface. It is to be noted that one information providing server 14 and one information requesting server 15 are shown in each of the private networks 10, 11, and 12 depicted in FIG. 1, but the plurality of information providing servers 14 and the plurality of information requesting servers 15 are actually present in each of the private networks 10, 11, and 12.

In each of the private networks 10, 11, and 12, when an identifier holding user 19 who has a predetermined identifier provided from the information providing server 14 presents the identifier to the information requesting server 15, the predetermined information associated with the presented identifier is provided to the information requesting server 15 from the information providing server 14. A specific example of information exchange in each of the private networks 10, 11, and 12 is as follows. When the identifier holding user 19 presents the identifier to the information requesting server 15, the information requesting server 15 requests the information providing server 14 for information required for identifier authentication, and the information providing server 14 transmits the information required for identifier authentication to the information requesting server 15. The information requesting server 15 authenticates the user 19 based on the transmitted identifier authentication information.

Each of the private networks 10, 11, and 12 is a system that gives the identifier holding user 19 authority when the identifier holding user 19 presents the identifier, and has an Authentication, Authorization, Accounting (AAA) security function. Each of the private networks 10, 11, and 12 may confirm (authenticate) a specific user 19 and grant appropriate authority to the confirmed user 19 in some cases (management control), and preserves all kinds of records to monitor presence/absence of problems (audit). Authentication examines and judges validity of the user 19. Authenticating means, e.g., an ID number, a password, an IC card, or biometrics can be used for authentication. The management control grants appropriate authority to the valid user 19 in accordance with authority provided with respect to each of the networks 10, 11, and 12. The audit preserves records describing what kind of authority is given to an identifier and how and when the authority is used to enable examining these histories. As explained above, each of these private networks 10, 11, and 12 is a closed network set in one region or at one point, and cannot provide the information held by the information providing user 16 to an information requesting user other than the information requesting user 17 in the private network that the information providing user 16 belongs to as it is. However, in this system, as shown in FIGS. 1 and 2, the network is formed of the plurality of information providing servers 14, the plurality of information requesting servers 15, and the location management server 13 that unifies management of these information providing servers 14, and the predetermined information associated with the identifier presented by the identifier holding user 19 can be shared.

The location management server 13 is managed by, e.g., an enterprise that carries out registry business of domain names or an enterprise (a service registry 20) that manages registration of domain names. The location management server 13 is a computer having a high-capacity hard disk mounted thereon, and can be connected with the Internet 18. Although not shown, a keyboard, a printer, or a display is connected with the location management server 13 through an interface. The location management server 13 is formed of a plurality of location management server groups, and the server groups is divided into the highest-order first location server (a route server) to the lowest-order nth location management server. The location management servers 13 and the information providing server form a pyramidal shape that has the first location management server at an apex and spreads from the first location management server toward the information providing server 14 through the nth location management server. The location management servers 13 and the information providing server 14 form a tree structure that branches from the first location management server toward the information providing server 14 through the nth location management server. It is to be noted that, although not shown, the plurality of each of first to nth location management servers are present.

Each of these location management servers 13 hierarchically decentralizes and manages an IP address (location information) of each information providing server 14 that holds predetermined information. That is, any one of the plurality of nth location management servers manages of a confirmed IP address (confirmed location information) of the information providing server 14, and any one of the plurality of (n−1)th location management servers manages a confirmed IP address (confirmed location information) of the nth location management server. In this manner, the location management servers 13 hierarchically manage the confirmed IP addresses (confirmed location information) of the first to nth location management servers or the information providing server 14 to be tracked back from the information providing server 14 to the first location management server through the nth location management server.

Here, the nth location management server may be the first location management server or the third location management server in some cases, or may be the fifth location management server or the 10th location management server in some cases. As an example of registering an IP address of the information providing server 14 in the location management server, the information providing user 16 transmits an electronic document having the IP address written therein to the enterprise that manages the location management server 13 through the Internet 18 (electronic registration). Alternatively, registration is carried out by presenting a document having the IP address written therein to the enterprise that manages the location management server (registration in writing).

An identifier is divided into several hierarchical portions. Here, in the identifier, the highest-order portion is a portion that identifies an IP address of the second location management server, the lowest-order portion is a portion that identifies information to be provided, and respective intermediate portions between the highest-order portion and the lowest-order portion are portions that identify IP addresses of the second to nth location management servers and the information providing server. The IP address of the second location management server corresponding to the highest-order portion in the identifier is managed by the predetermined first location management server. IP addresses of the third to nth location management servers corresponding to the second to (n−1)th portions in the identifier are managed by the predetermined second to (n−1)th location management servers corresponding to the next higher hierarchy. The confirmed IP address of the information providing server corresponding to the nth portion in the identifier is managed by the predetermined nth location management server. Information to be provided is identified based on the lowest-order (n+1)th portion in the identifier.

When the identifier holding user 19 presents the identifier to the information requesting server 15, the information requesting server 15 asks the location management server 13 about a location of the information providing server 14 corresponding to the presented identifier. The location management server 13 returns the confirmed IP address (confirmed location information) of the information providing server 14 corresponding to the identifier to the information requesting server 15 based on the IP address (location information) stored therein. The information requesting server 15 uses the confirmed IP address returned from the location management server 13 accesses the information providing server 14 corresponding to the confirmed IP address and receives predetermined information corresponding to the identifier from the accessed information providing server 14.

A retrieval procedure of the location management server 13 when the information requesting server 15 asks the location management server 13 about a location of the information providing server 14 will now be explained as follows with reference to FIG. 3. In this explanation of the retrieval procedure, the third location management server 13c is determined as the nth location management server. It is to be noted that each location management server registers an IP address corresponding to its own identifier in a higher-order location management server close to itself. Each location management server is managed by the higher-order location management server close to itself based on the registered IP address. The higher-order location management server manages the IP address of the lower-order location management server alone that is close to itself, and does not manage IP addresses of location management servers lower than this lower-order location management server closest to itself.

The location management server 13, the information providing server 14, or the information requesting server 15 is connected with the Internet 18. When the identifier holding user 19 presents an identifier to the information requesting server 15, the information requesting server 15 asks the first location management server 13a about a location of the information providing server 14 corresponding to the presented identifier. The first location management server 13a retrieves a confirmed IP address (confirmed location information) of the second location management server 13b from the highest-order portion in the identifier, and returns the retrieved IP address of the second location management server 13b to the information requesting server 15. The searched second location management server 13b in the plurality of second location management servers 13b that are continuous with the first location management server 13a in the form of a tree is connected with the third location management server 13c (the nth location management server) storing the confirmed IP address (confirmed location information of the information providing server) of the information providing server 14.

When the confirmed IP address of the second location management server is returned to the information requesting server 15, the information requesting server 15 accesses the second location management server 13b based on this IP address and asks the accessed second location management server 13b about a location of the information providing server 14 corresponding to the identifier. The second location management server 13b retrieves a confirmed IP address (confirmed location information) of the third location management server 13c from the second portion in the identifier, and returns the retrieved IP address of the third location management server 13c to the information requesting server 15. When the confirmed IP address of the third location management server 13c is returned to the information requesting server 15, the information requesting server 15 accesses the third location management server 13c based on this IP address and asks the accessed third location management server 13c about a location of the information providing server 14 corresponding to the identifier. The third location management server 13c retrieves a confirmed IP address (confirmed location information) of the information providing server 14 from the third portion in the identifier, and returns the retrieved IP address of the information providing server 14 to the information requesting server 15. When the confirmed IP address of the information providing server 14 is returned to the information requesting server 15, the information requesting server 15 accesses the information providing server 14 having this IP address and requests the accessed information providing server 14 for predetermined information corresponding to the identifier. The information providing server 14 retrieves predetermined information from the lowest-order (fourth) portion in the identifier and provides the retrieved predetermined information (identifier authentication information) to the information requesting server 15. The information requesting server 15 receives the predetermined information from the information providing server 14.

The information providing server 14 corresponding to the presented identifier is retrieved by repeating the inquiry and the response between the location management servers 13a to 13c and the information requesting server 15 starting from the first location management server to the third location management server (the nth location management server) in this manner. The information requesting server 15 that has received the response about the confirmed IP address of the information providing server 14 accesses the information providing server 14 corresponding to this IP address and requests the accessed information providing server 14 for predetermined information for identifier authentication. The information providing server 14 provides the predetermined information for identifier authentication corresponding to the identifier in response to the request from the information requesting server 15.

It is to be noted that the series of processes including the inquiry about the location of the information providing server 14 with respect to the first location management server 13a, return of the IP address of the second location management server 13b to the information requesting server 15 from the first location management server 13a, the inquiry about the location of the information providing server 14 with respect to the second location management server 13b, return of the IP address of the third location management server 13c to the information requesting server 15 from the second location management server 13b, the inquiry about the location of the information providing server 14 with respect to the third location management server 13c, return of the confirmed IP address to the information requesting server 15 from the third location management server 13c, the request for the predetermined information with respect to the information providing server from the information requesting server 15, and reception of the predetermined information by the information requesting server 15 are executed through the Internet 18.

The information requesting server 15 stores the confirmed IP address of the information providing server 14 that has been returned upon retrieval of the location in the past and also stores the confirmed IP address of the location management server 13 that has been returned upon retrieval of the location in the past. When the identifier corresponding to the confirmed IP address of the location management server and the confirmed IP address of the information providing server that have been returned upon retrieval of the locations in the past is again presented to the information requesting server 15, the system omits retrieval of the location management server higher in order than the location management server that stores the confirmed IP address saved in the information requesting server 15 in the location management servers 13. On the other hand, when the location management server lower in order than the lower-order location management server close to the location management server storing the confirmed IP address and the information providing server must be retrieved, the information providing server 14 corresponding to the presented identifier is retrieved by repeating an inquiry and a response between the location management server 13 and the information requesting server 15 starting from the lower-order location management server close to the location management server storing the confirmed IP address toward the lower-order location management servers, and the retrieved information providing server 14 provides predetermined information corresponding to the identifier to the information requesting server 15.

For example, in a case where the confirmed IP address of the information providing server 14 that has been returned based on retrieval of the location in the past is stored in the specific third location management server 13c and the information requesting server 15 stores this confirmed IP address, when the identifier corresponding to the confirmed IP address of the information providing server 14 that has been returned based on retrieval of the location in the past is again presented to the information requesting server 15, the information requesting server 15 immediately requests the information providing server 14 to provide predetermined information based on the stored confirmed IP address of the information providing server 14 without repeating an inquiry and a response between the location management server 13 and the information requesting server 15 starting from the first location management server 13a to the third location management server 13c.

Furthermore, in a case where the confirmed IP address of the second location management server 13b that has been returned based on retrieval of the location in the past is stored in the specific first location management server 13a and the information requesting server 15 stores this confirmed IP address, when the identifier corresponding to the confirmed IP address of the second location management server 13b that has returned based on retrieval of the location in the past is again presented to the information requesting server 15, the information requesting server 15 immediately requests the location management server 13b to return the confirmed IP address of the information providing server 14 based on the stored confirmed IP address of the second location management server 13b without repeating an inquiry and a response between the first location management server 13a and the information requesting server 15. In this case, a location management server whose level is lower than the second location management server 13b must be retrieved, the inquiry and the response are repeated between the location management server 13 and the information requesting server 15 starting from the second location management server 13b to the lower-order location management servers to retrieve the information providing server 14 corresponding to the presented identifier, and the retrieved information providing server 14 provides predetermined information corresponding to the presented identifier to the information requesting server 15.

Storage times of the confirmed IP address of the location management server 13 and the confirmed IP address of the information providing server 14 that have been returned based on retrieval of the locations in the past are set in the information requesting server 15. It is preferable for the storage time to be set every several days, several weeks, or several months. It is to be noted that 0 second can be set. When the storage times pass, the information requesting server 15 erases the confirmed IP address of the location management server 13 and the confirmed IP address of the information providing server 14 stored therein. It is to be noted that, when the identifier holding user 19 presents an identifier corresponding to the erased confirmed IP addresses to the information requesting server 15 after erasing the confirmed IP addresses, retrieval of the information providing server 14 starts from the first location management server. That is, the inquiry and the response are repeated between the location management server 13 and the information requesting server 15 starting from the first location management server to the nth location management server to retrieve the information providing server 14 corresponding to the presented identifier, and the retrieved information providing server 14 provides predetermined information corresponding to the presented identifier to the information requesting server.

The information requesting server 15 can arbitrarily erase the confirmed IP address of the location management server 13 and the confirmed IP address of the information providing server 14 that have been stored therein and returned based on retrieval of the locations in the past. For example, when a predetermined time passes after storage of the confirmed IP addresses, the information requesting server 15 judges whether the confirmed IP address of the location management server 13 or the information providing server 14 has been changed. In this case, the information requesting server 15 uses the confirmed IP address to access the location management server 13 or the information providing server 14 corresponding to this IP address, and determines that the confirmed IP address has been changed and erases this IP address when access is impossible. It is to be noted that, when the identifier holding user 19 presents an identifier corresponding to the erased confirmed IP address to the information requesting server 15 after arbitrarily erasing the confirmed IP address, retrieval of the information providing server 14 starts from the first location management sever. That is, the inquiry and the response are repeated between the location management server 13 and the information requesting server 15 starting from the first location management server to the nth location management server to retrieve the information providing server 14 corresponding to the presented identifier, and the retrieved information providing server 14 provides predetermined information corresponding to the presented identifier to the information requesting server.

The information requesting server 15 counts a presentation time that an identifier is presented to the information requesting server 15, and transmits a counted presentation time to the information providing server 14. When the presentation time of the identifier exceeds a set time, the information providing server 14 stops provision of information corresponding to the identifier to the information requesting server 15. The set time is preset in the information providing server 14, and it is preferably within 1 minute or more preferably within 10 seconds.

An example where this identifier authentication system is used for a home-delivery service will now be explained. In the home-delivery service, whether a deliveryman (the identifier holding user 19) who has visited a condominium is a legitimate company member of a home-delivery company (the information providing user 16) is authenticated. The information providing server 14 is installed in the home-delivery company that the deliveryman belongs to. A confirmed IP address (confirmed location information) of the information providing server 14 is registered in the location management server 13 managed by an enterprise (the service registry 20) that carries out registry business of domain names or management of registration of domain names. The home-delivery company lends the deliveryman an IC card storing a predetermined ID number (the identifier).

The deliveryman goes to a condominium where a recipient (the information requesting user 17) lives in order to deliver a delivery. The information requesting server 15 is installed in a condominium management company of the recipient. It is to be noted that the location management server 13, the information providing server 14, or the information requesting server 15 is constantly connected with the Internet 18. The deliveryman who has arrived the condominium inputs a room number of the recipient from a numeric keypad unit of a centralized intercom provided at an entrance of the condominium, and asks the recipient to receive the delivery through the intercom. An IC card reading device connected with the information requesting server 15 of the condominium management company is installed near the intercom.

The recipient instructs the deliveryman to present the IC card he/she has to the IC card reading device to confirm whether the deliveryman is a legitimate company member of the home-delivery company. When the deliveryman presents the IC card to the IC card reading device, an ID number stored in the IC card is read, and the ID number is transmitted from the reading device to the information requesting server 15 of the recipient. The ID number is divided into several hierarchical portions, the respective divided hierarchical portions correspond to an IP address of each location management server, an IP address of the information providing server, and predetermined information. For example, in the ID number, the highest-order ID number corresponds to an IP address of the second location management server, the lowest-order ID number corresponds to predetermined information, and respective ID numbers between the highest-order ID number and the lowest-order ID number correspond to IP addresses of each location management server and the information providing server. Moreover, for example, the highest-order portion of an identifier corresponds to service classification information, an intermediate portion of the identifier corresponds to a category of business or home-delivery company classification information, and the lowest-order portion of the identifier corresponds to name information or facial portrait information of the deliveryman.

The information requesting server 15 asks the location management server 13 about a location of the information providing server 14 of the home-delivery company. In the location management server 13, an inquiry and a response are repeated between the location management server and the information requesting server starting from the first location management server to the nth location management server to retrieve a confirmed IP address (confirmed location information) of the information providing server 14 of the home-delivery company corresponding to the ID number, and the retrieved confirmed IP address is returned to the information requesting server 15. The information requesting server 15 accesses the information providing server 14 of the home-delivery company corresponding to this IP address, and then requests the information providing server 14 to provide predetermined information (authentication information) for identifier authentication. Here, the predetermined information for identifier authentication means a name of the home-delivery company that the deliveryman having this identifier belongs to, a name of the deliveryman, a facial portrait of the deliveryman, and others, and includes all information that can specify the deliveryman. The information providing server 14 transmits the information for identifier authentication to the information requesting server 15 in response to the request from the information requesting server 15. A display of the information requesting server 15 displays the transmitted information concerning the deliveryman, and the recipient sees the displayed information to judge whether the deliveryman standing at the entrance of the condominium is a legitimate company member of the home-delivery company.

The information requesting server 15 counts a reading time (a presentation time of the identifier) of the ID number after the IC card is presented to the IC card reading device, and transmits the counted reading time to the information providing server 14. The information providing server 14 compares the received reading time with a predetermined set time, and stops transmission of the predetermined information concerning the deliveryman to the information requesting server 15 when the reading time exceeds the set time.

The information requesting server 15 stores a confirmed IP address of the location management server 13 corresponding to the ID number and a confirmed IP address of the information providing server 14 of the home-delivery company corresponding to the ID number. When the ID number (the identifier) corresponding to the confirmed IP address of the information providing server 14 stored in the information requesting server 15 is again presented to the information requesting server 15, the information requesting server 15 immediately requests the information providing server 14 to provide predetermined information concerning the deliveryman based on the confirmed IP address of the information providing server 14 stored in the information requesting server 15 without repeating an inquiry and a response between the location management server 13 and the information requesting server 14 until reaching the stored information providing server 14. On the other hand, when the ID number (the identifier) corresponding to the confirmed IP address of the location management server 13 stored in the information requesting server 15 is again presented to the information requesting server 15, the location management server 13 whose level is lower than that of the stored location management server 13 and the information providing server 14 must be retrieved, an inquiry is started from the stored location management server 13, an inquiry and a response are repeated between the location management server 13 and the information requesting server 15 to retrieve the information providing server 14, and the retrieved information providing server 14 provides predetermined information concerning the deliveryman to the information requesting server.

In the information requesting server 15, storage times of the confirmed IP address of the location management server 13 and the confirmed IP address of the information providing server 14 of the home-delivery company are set. When the storage times pass, the information requesting server 15 erases the confirmed IP address of the location management server 13 and the confirmed IP address of the information providing server 14 of the home-delivery company stored therein. Additionally, the information providing server 15 (the information providing user 17) can arbitrarily erase the confirmed IP address of the location management server and the confirmed IP address of the information providing server 14 of the home-delivery company stored in the information requesting server 15.

This system enables the predetermined information held in the information providing servers 14 to be shared, and can readily obtain the predetermined information stored in the information providing servers 14. In the system, since the location management server 13 unifies management of all the information providing servers 14, asking the location management server 13 about location information of the information providing servers 14 enables all the information requesting servers 15 to access all the information providing servers 14, and the information requesting servers 15 can receive the predetermined information held in the information providing servers 14.

In the system, since the location management server 13, the information providing servers 14, and the information requesting servers 15 are connected with each other through the Internet 18 and a series of processes including inquiries, responses, and reception of information are executed through the Internet 18, the predetermined information held in the information providing servers 14 can be shared by utilizing the Internet 18, and any person can readily obtain the predetermined information held in all the information providing servers 14 if there is an environment connected with the Internet 18. According to this system, utilizing the Internet 18 as an existing public communication network enables sharing all the predetermined information held in the plurality of information providing servers 14, and various kinds of identifier authentication services can be received without being restricted to a specific identifier authentication service.

In the system, since the location management server 13 is divided into the highest-order first location management server to the lowest-order nth location management server and the plurality of location management servers 13 hierarchically decentralize and manage IP addresses of the information providing servers 14, a load on the location management server 13 can be reduced as compared with an example where the single location management server 13 manages the IP addresses of the information providing server 14. In the system, retrieval of the location management server 13 whose level is higher than that of the information providing server 14 or the location management server 13 storing the confirmed IP address saved in the information requesting server 15 is omitted and, when the location management server whose level is lower than that of the low-order location management server close to the location management server storing the confirmed IP address and the information providing server must be retrieved, the information providing server 14 corresponding to the identifier is retrieved by repeating an inquiry and a response between the location management server 13 and the information requesting server 15 starting from the low-order location management server 13 close to the location management server 13 storing the confirmed IP address toward the lower-order location management servers, and hence retrieval of the information providing server 14 does not have to be repeated from the first location management server, thereby rapidly retrieving the confirmed IP address of the information providing server 14. This system can eliminate a load on the location management servers 13 whose levels are higher than that of the location management server 13 storing the confirmed IP address.

Since the information requesting server 15 erases the confirmed IP address stored therein when a storage time of the confirmed IP address passes, even if the IP address of the location management server 13 or the information providing server 14 corresponding to this confirmed IP address is changed after the information requesting server 15 stores the confirmed IP address, the system can cope with this change, thereby accurately retrieving a location of the information providing server 14. Further, since the information requesting server 14 (the information requesting user 17) can arbitrarily erase the confirmed IP address stored therein, even if the IP address of the location management server 13 or the information providing server 14 corresponding to this confirmed IP address is changed after the information requesting server 15 stores the confirmed IP address, the system can cope with this change, thus accurately retrieving a location of the information providing server 14. Since provision of predetermined information to the information requesting server 15 is stopped when a presentation time of an identifier for the information requesting server 15 exceeds a set time, the system can avoid unauthorized use of the identifier by any person other than the identifier holding user 19, thereby preventing information of the identifier holding user 19 from fraudulently flowing out.

The invention claimed is:

1. An identifier authentication system in which an information providing server holding identifier authentication information for authenticating an identifier given to an identifier holding user and an information requesting server that requests the information providing server to provide the identifier authentication information from each of a plurality of independent private networks and presenting the identifier to the information requesting server by the identifier holding user having the identifier given from the information providing server enables providing the identifier authentication information corresponding to the presented identifier to the information requesting server from the information providing server, wherein the system comprises a location management server that unifies management of the information providing servers, wherein the location management server is divided into the highest-order first location management server to the lowest-order nth location management server, the first to nth location management servers and the information providing server form a tree structure that branches from the first to nth location management servers toward the information providing server, and confirmed location information of the information providing server is registered in any one of the location management servers, wherein the identifier is divided into several hierarchical portions, which are the highest-order portions that identifies an IP address of the second location management server, the lowest-order portion that identifies the identifier authentication information provided from the information providing server, and respective intermediate portions that identify IP addresses of the second to nth location management servers and the information providing server, the IP address of the second location management server corresponding to the highest-order portion in the identifier is managed by the first location management server, and the IP addresses of the third to nth location management servers corresponding to the second to (n−1)th portions in the identifier are managed by the predetermined second to (n−1)th location management servers corresponding to the next higher hierarchy, wherein the confirmed IP address of the information providing server corresponding to the nth portion in the identifier is managed by the predetermined nth location management server, wherein in the system, when the identifier holding user presents the identifier to the information requesting server, the information requesting server asks the first location management server about a location of the information providing server corresponding to the presented identifier, then the first location management server returns confirmed location information of the second location management server corresponding to the presented identifier to the information requesting server based on the location information, the second location management server returns confirmed location information of the third location management server corresponding to the presented identifier to the information requesting server based on the location information when the information requested server accesses the second location management server corresponding to the returned confirmed location information and asks the second location management server about a location of the information providing server corresponding to the identifier, the information providing server corresponding to the presented identifier is retrieved by repeating an inquiry and a response between the location management servers and the information requesting servers starting from the first location management server to the nth location management server in this manner, the information requesting server requests the identifier authentication information identified by the identifier to the retrieved information providing server, and the retrieved information providing server retrieves the identifier authentication from the identifier, and provides the retrieved identifier authentication information to the information requesting server, and the information requesting server receives the presented identifier authentication information corresponding to the identifier from the retrieved information providing server.

2. The identifier authentication system according to claim 1, wherein the location management server is divided into the highest-order first location management server to the lowest-order nth location management server, the first to nth location management servers and the information providing server form a tree structure that branches from the first to nth location management servers toward the information providing server, and confirmed location information of the information providing server is registered in any one of the plurality of nth location management servers, and the first location management server returns confirmed location information of the second location management server corresponding to the presented identifier to the information requesting server based on the location information when the information requesting server asks the first location management server about a location of the information providing server corresponding to the presented identifier, the second location management server returns confirmed location information of the third location management server corresponding to the presented identifier to the information requesting server based on the location information when the information requesting server accesses the second location management server corresponding to the returned confirmed location information and asks the second location management server about a location of the information providing server corresponding to the identifier, the information providing server corresponding to the presented identifier is retrieved by repeating an inquiry and a response between the location management servers and the information requesting server starting from the first location management server to the nth location management server in this manner, and the retrieved information providing server provides identifier authentication information corresponding to the presented identifier to the information requesting server.

3. The identifier authentication system according to claim 2, wherein the information requesting server stores confirmed location information of the location management server and the information providing server returned based on retrieval of locations in the past, and the system omits retrieval of a location management server whose level is higher than that of the location management server storing the confirmed location information saved in the information requesting server when an identifier corresponding to the confirmed location information returned based on retrieval of locations in the past is again presented to the information requesting server, and retrieves the information providing server corresponding to the presented identifier by repeating an inquiry and a response between the location management server and the information requesting server starting from the low-order location management server close to the location management server storing the confirmed location information toward the lower-order location management servers when the low-order location management server that is lower in order than that of the low-order management server close to the location management server storing the confirmed location information and the information providing server must be retrieved, and the retrieved information providing server provides identifier authentication information corresponding to the presented identifier to the information requesting server.

4. The identifier authentication system according to claim 3, wherein storage times of confirmed location information of the location management server and the information providing server returned based on retrieval of locations in the past are set in the information requesting server, and the information requesting server erases the confirmed location information of the location management server and the information providing server stored therein when the storage times pass.

5. The identifier authentication system according to claim 3, wherein the information requesting server is able to arbitrarily erase the confirmed location information of the location management server and the information providing server stored in the information requesting server and returned based on retrieval of locations in the past.

6. The identifier authentication system according to claim 1, wherein, in the system, when a presentation time that the identifier is presented to the information requesting time is transmitted to the information providing server from the information requesting server and the information providing server determines that the presentation time exceeds a set time, provision of the identifier authentication information to the information requesting server is stopped.

7. The identifier authentication system according to claim 1, wherein the information providing servers, the information requesting servers, and the location management server are connected with each other through the Internet, and a series of processes including an inquiry of a location of the information providing server with respect to the location management server, return of the confirmed location information from the location management server to the information requesting server, and reception of the identifier authentication information by the information requesting server are executed in the system through the Internet.

8. The identifier authentication system according to claim 4, wherein the information requesting server is able to arbitrarily erase the confirmed location information of the location management server and the information providing server stored in the information requesting server and returned based on retrieval of locations in the past.

9. The identifier authentication system according to claim 2, wherein, in the system, when a presentation time that the identifier is presented to the information requesting time is transmitted to the information providing server from the information requesting server and the information providing server determines that the presentation time exceeds a set time, provision of the identifier authentication information to the information requesting server is stopped.

10. The identifier authentication system according to claim 3, wherein, in the system, when a presentation time that the identifier is presented to the information requesting time is transmitted to the information providing server from the information requesting server and the information providing server determines that the presentation time exceeds a set time, provision of the identifier authentication information to the information requesting server is stopped.

11. The identifier authentication system according to claim 4, wherein, in the system, when a presentation time that the identifier is presented to the information requesting time is transmitted to the information providing server from the information requesting server and the information providing server determines that the presentation time exceeds a set time, provision of the identifier authentication information to the information requesting server is stopped.

12. The identifier authentication system according to claim 5, wherein, in the system, when a presentation time that the identifier is presented to the information requesting time is transmitted to the information providing server from the information requesting server and the information providing server determines that the presentation time exceeds a set time, provision of the identifier authentication information to the information requesting server is stopped.

13. The identifier authentication system according to claim 2, wherein the information providing servers, the information requesting servers, and the location management server are connected with each other through the Internet, and a series of processes including an inquiry of a location of the information providing server with respect to the location management server, return of the confirmed location information from the location management server to the information requesting server, and reception of the identifier authentication information by the information requesting server are executed in the system through the Internet.

14. The identifier authentication system according to claim 3, wherein the information providing servers, the information requesting servers, and the location management server are connected with each other through the Internet, and a series of processes including an inquiry of a location of the information providing server with respect to the location management server, return of the confirmed location information from the location management server to the information requesting server, and reception of the identifier authentication information by the information requesting server are executed in the system through the Internet.

15. The identifier authentication system according to claim 4, wherein the information providing servers, the information requesting servers, and the location management server are connected with each other through the Internet, and a series of processes including an inquiry of a location of the information providing server with respect to the location management server, return of the confirmed location information from the location management server to the information requesting server, and reception of the identifier authentication information by the information requesting server are executed in the system through the Internet.

16. The identifier authentication system according to claim 5, wherein the information providing servers, the information requesting servers, and the location management server are connected with each other through the Internet, and a series of processes including an inquiry of a location of the information providing server with respect to the location management server, return of the confirmed location information from the location management server to the information requesting server, and reception of the identifier authentication information by the information requesting server are executed in the system through the Internet.

17. The identifier authentication system according to claim 6, wherein the information providing servers, the information requesting servers, and the location management server are connected with each other through the Internet, and a series of processes including an inquiry of a location of the information providing server with respect to the location management server, return of the confirmed location information from the location management server to the information requesting server, and reception of the identifier authentication information by the information requesting server are executed in the system through the Internet.

* * * * *